United States Patent
Jo et al.

(10) Patent No.: US 9,036,124 B2
(45) Date of Patent: May 19, 2015

(54) DISPLAY DEVICE

(75) Inventors: JaeHyung Jo, Busan (KR); JongSin Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 135 days.

(21) Appl. No.: 13/552,331

(22) Filed: Jul. 18, 2012

(65) Prior Publication Data

US 2013/0058020 A1   Mar. 7, 2013

(30) Foreign Application Priority Data

Sep. 7, 2011   (KR) ........................ 10-2011-0090474

(51) Int. Cl.
  *G02F 1/1345*   (2006.01)
  *G02F 1/1339*   (2006.01)
  *G02F 1/1333*   (2006.01)

(52) U.S. Cl.
  CPC .......... *G02F 1/13452* (2013.01); *G02F 1/1345* (2013.01); *G02F 2001/133317* (2013.01)

(58) Field of Classification Search
  CPC .............. G02F 1/13452; G02F 1/1345; G02F 1/13458; G02F 2001/13456; G02F 1/13394; G02F 1/1339; G02F 1/133345; G02F 1/133707; G02F 2001/13396; G02F 1/133514; G02F 2001/133388
  See application file for complete search history.

(56) References Cited

U.S. PATENT DOCUMENTS

| | | | |
|---|---|---|---|
| 5,798,744 A | 8/1998 | Tanaka et al. | |
| 6,515,729 B1 * | 2/2003 | Hoshino | 349/158 |
| 6,737,289 B2 * | 5/2004 | Woo et al. | 438/30 |
| 6,977,808 B2 * | 12/2005 | Lam et al. | 361/679.24 |
| 7,092,062 B2 * | 8/2006 | Ozawa | 349/152 |
| 7,812,909 B2 * | 10/2010 | Cho et al. | 349/142 |
| 7,830,490 B2 * | 11/2010 | Park | 349/153 |
| 2004/0051837 A1 * | 3/2004 | Lee et al. | 349/152 |
| 2008/0062109 A1 | 3/2008 | Kim et al. | |
| 2008/0278896 A1 * | 11/2008 | Kawano | 361/681 |

FOREIGN PATENT DOCUMENTS

JP    8-46206 A    2/1996
KR    10-0304261 B1    9/2001

* cited by examiner

*Primary Examiner* — Richard Kim
*Assistant Examiner* — Angela Davison
(74) *Attorney, Agent, or Firm* — Birch, Stewart, Kolasch & Birch, LLP

(57) ABSTRACT

Disclosed is a display device. The display device includes an upper substrate; a lower substrate having gate and data lines, with exposing a part of the lower surface of the upper substrate; a sealant for adhering the upper substrate to the lower substrate; a panel driver connected to the part of a lower surface of the upper substrate; a pad formed on the lower substrate, for applying a signal to the gate and data lines; and a connection part formed on the upper substrate, for connecting the pad and the panel driver. Accordingly, the thickness of the display device decreases, and a step height is not formed at a front surface of the display device, whereby the present invention can obtain an aesthetic design effect in that the front surface of the display device is shown as one structure.

17 Claims, 7 Drawing Sheets

DISPLAY DEVICE

CROSS-REFERENCE TO RELATED APPLICATIONS

This application claims the benefit of the Korean Patent Application No. 10-2011-0090474 filed on Sep. 7, 2011, which is hereby incorporated by reference as if fully set forth herein.

BACKGROUND

1. Field of the Invention

The present invention relates to a display device, and more particularly, to a display device which has a thin thickness and an enhanced aesthetic appearance.

2. Discussion of the Related Art

Generally, since LCD devices are driven with a low operating voltage, the LCD devices have low power consumption and are used as portable devices. Accordingly, the LCD devices are widely applied to various fields such as notebook computers, monitors, spacecrafts, airplanes, etc.

The LCD devices have been enlarged in size due to the decrease in weight and volume. In the LCD devices, moreover, research and development are being continuously done on a response time and image quality, leading to the much advance of quality.

Recently, research and development are being done on the above-described technology and the design of products appealing to consumers. For example, in LCD devices, research and development are being continuously done on a design with enhanced aesthetic appearance that can induce consumers to buy by minimizing a thickness and appealing to consumers' aesthetic appearance.

However, due to structural characteristic, LCD devices of the related art that have been developed to date have limitations in minimizing a thickness and enhancing a aesthetic appearance. The limitations of the LCD devices of the related art will now be described in detail with reference to FIG. 1.

FIG. 1 is a schematic sectional view illustrating a related art LCD device.

As seen in FIG. 1, the related art LCD device includes a liquid crystal display panel 10, a panel driver 20, and a case 30.

The liquid crystal display panel 10 includes an upper substrate 12, a lower substrate 14, a liquid crystal layer 16, and a sealant 18.

A plurality of gate lines and data lines are intersected and formed to define a plurality of pixel areas, on the lower substrate 14. A thin film transistor is formed in a pixel area where a gate line and a data line intersect each other, and a pixel electrode connected to the thin film transistor is formed in the pixel area.

In order to apply signals to the respective gate lines and data lines that are formed on the lower substrate 14, one side periphery area of the lower substrate 14 needs be exposed externally, and thus, the upper substrate 12 is not disposed in the one side periphery area of the lower substrate 14.

The panel driver 20 is disposed in the externally-exposed one side periphery area of the lower substrate 14, and delivers signals to the respective gate lines and data lines.

The case 30 is provided to cover a peripheral region of the liquid crystal display panel 10. As described above, since the panel driver 20 is disposed in the one side periphery area of the lower substrate 14, it is required to prevent the external exposure of the panel driver 20, for which the case 30 is applied.

In this way, the case 30 is provided to cover the peripheral region of the liquid crystal display panel 10 for preventing the exposure of the panel driver 20, and disposed on the upper substrate 12 because of structural characteristic. Due to this reason, the LCD device has the following limitations.

First, since the case 30 is disposed on the upper substrate 12, the thickness of the LCD device increases in proportion thereto.

Second, since the case 30 protrudes further than the upper substrate 12, a step height is formed at the front surface of the LCD device, causing the decrease in aesthetic appearance.

Third, since the case 30 is required to prevent the exposure of the panel driver 20, the width of the case 30 increases, and thus, the Bezel width of the LCD device increases, causing the decrease in aesthetic appearance.

SUMMARY

Accordingly, the present invention is directed to provide a display device that substantially obviates one or more problems due to limitations and disadvantages of the related art.

An aspect of the present invention is directed to provide a display device which has a minimized thickness and an enhanced aesthetic appearance.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device comprising: an upper substrate; a lower substrate having gate and data lines, with exposing a part of a lower surface of the upper substrate; a sealant for adhering the upper substrate to the lower substrate; a panel driver connected to the part of the lower surface of the upper substrate; a pad formed on the lower substrate, for applying a signal to the gate and data lines; and a connection part formed on the upper substrate, for connecting the pad and the panel driver It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, the embodiments of the present invention will be described in detail with reference to the accompanying drawings.

Figure 1:
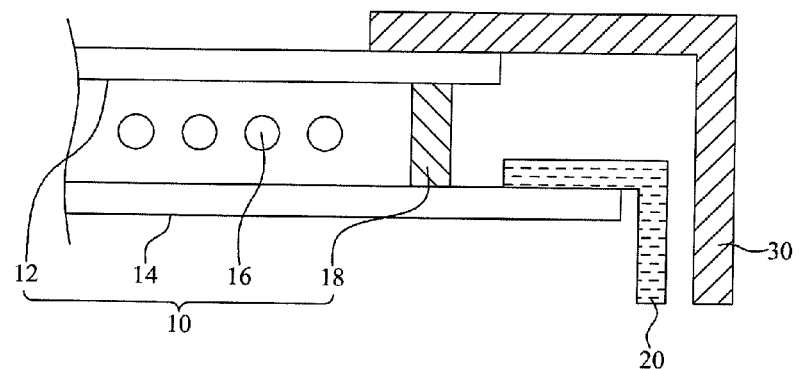
FIG. 1 is a schematic sectional view illustrating a related art LCD device.
Figure 2:
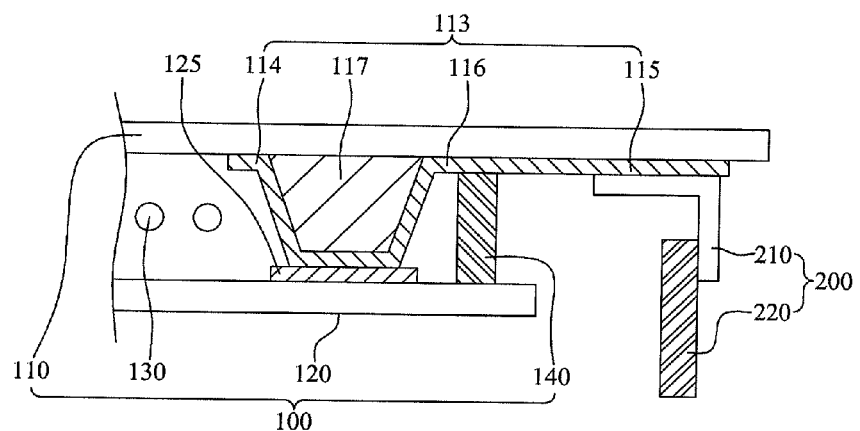
FIG. 2 is a schematic sectional view illustrating an LCD device according to an embodiment of the present invention.

FIG. 2 is a schematic sectional view illustrating an LCD device according to an embodiment of the present invention.

As seen in FIG. 2, the LCD device according to an embodiment of the present invention includes a liquid crystal display panel 100 and a panel driver 200 that is connected to the liquid crystal display panel 100.

The liquid crystal display panel 100 includes an upper substrate 110, a lower substrate 120, a liquid crystal layer 130, and a sealant 140.

The upper substrate 110 and the lower substrate 120 are separated from each other by a certain interval and faces each other. The liquid crystal layer 130 is formed in a space between the upper substrate 110 and the lower substrate 120. The sealant 140 is formed at an edge of each of the upper substrate 110 and lower substrate 120, connects the upper substrate 110 and the lower substrate 120, and seals an internal space of the liquid crystal display panel 100.

A pad 125 is formed on the lower substrate 120, more specifically, at a top of the lower substrate 120. The pad 125 is connected to a line (not shown) such as a gate line or a data line which is formed at the lower substrate 120, and allows a signal to be applied to the line.

A connection part 113 is formed on the upper substrate 110, more specifically, at a bottom of the upper substrate 110. The connection part 113 electrically connects the panel driver 200 and the pad 125 formed on the lower substrate 120.

According to the present embodiment, as described above, the pad 125 formed on the lower substrate 120 is not directly connected to the panel driver 200 but is connected to the panel driver 200 through the connection part 113 formed at the bottom of the upper substrate 110.

Accordingly, the upper substrate 110 is extended longer than the lower substrate 120 so as to expose the connection part 113 to the outside, the panel driver 200 is adhered to the bottom of the long-extended upper substrate 110.

In this way, since the panel driver 200 is adhered to the bottom of the upper substrate 110, the panel driver 200 is not exposed to the front surface of the LCD device, and thus, unlike the related art, a separate case for covering the exposure of the panel driver 200 is not disposed at the top of the upper substrate 100.

As a result, since the separate case is not disposed at the top of the upper substrate 100, the thickness of the LCD device is reduced, and moreover, a step height is not formed at the front surface of the LCD device, whereby the present invention can obtain an aesthetic design effect in that the front surface of the LCD device is shown as one structure.

Hereinafter, the detailed configuration of the connection part 113 for electrically connecting the pad 125 and the panel driver 200 will be described, and then the panel driver 200 will be described.

The connection part 113 includes a pad contact part 114, a driver contact part 115, a connection line 116, and a protrusion portion 117.

The pad contact part 114 contacts the pad 125, and the driver contact part 115 contacts the panel driver 200. The connection line 116 connects the pad contact part 114 and the driver contact part 115.

The protrusion portion 117 enables a contact between the pad contact part 114 and the pad 125. That is, the upper substrate 110 and the lower substrate 120 are separated from each other by a certain interval, and thus, in order for the pad contact part 114 (formed on the upper substrate 110) to contact the pad 125 formed on the lower substrate 120, an element for guiding the pad contact part 114 to the position of the pad 125 is required.

Therefore, the protrusion portion 117 is formed between the upper substrate 110 and the pad contact part 114, and guides the pad contact part 114 to the position of the pad 125, thereby allowing the pad contact part 114 to be connected to the pad 125.

The panel driver 200 is electrically connected to the pad 125, which is formed on the lower substrate 120, through the connection part 113 formed on the upper substrate 110.

The panel driver part 200 includes a circuit film 210 and a Printed Circuit Board (PCB) 220.

The circuit film 210 is adhered to the connection part 113, more specifically, to the driver contact part 115. The circuit film 210 is connected to the PCB 220. Although not shown, a chip such as a data driving integrated circuit is formed on the circuit film 210, thereby forming a Chip On Film (COF) structure.

The PCB 220 applies various signals to the liquid crystal display panel 100 through the circuit film 210. Although not shown, a timing controller, various power source circuits, and at least one memory are mounted on the PCB 220.

The LCD device of FIG. 2 is for describing the technical spirit and scope of the present invention different from the related art LCD devices, and the other elements of the LCD device are not illustrated in FIG. 2. Hereinafter, the other elements and various embodiments of the present invention will be described in detail.

Figure 3A:
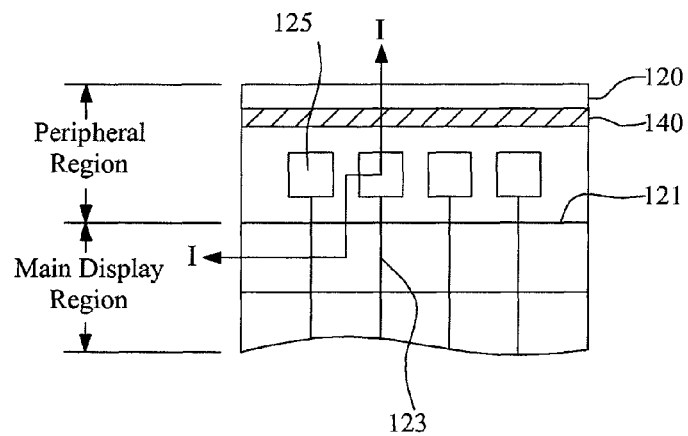
FIG. 3A is a schematic plan view illustrating a lower substrate according to an embodiment of the present invention.
Figure 3B:
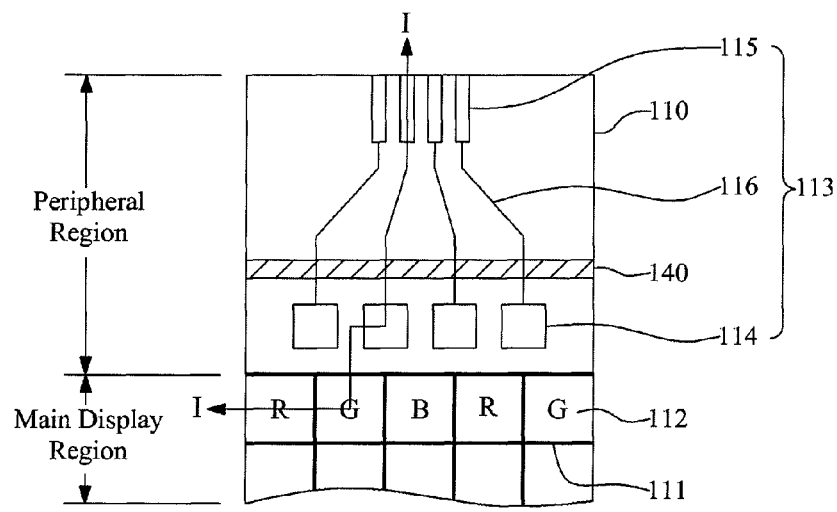
FIG. 3B is a schematic plan view illustrating an upper substrate according to an embodiment of the present invention.

FIG. 3 is a schematic plan view illustrating an LCD device according to an embodiment of the present invention. FIG. 3A is a schematic plan view illustrating the lower substrate 120, and FIG. 3B is a schematic plan view illustrating the upper substrate 110. Descriptions on these will be made below.

As seen in FIG. 3A, the lower substrate 120 includes a main display region and a peripheral region around the main display region.

The main display region is disposed at the center of the LCD device, and displays a main screen such as an moving image.

The peripheral region is disposed at the edge of the LCD device, and does not generally display a main screen such as a moving image. However, depending on the case, the peripheral region may display a sub-screen such as channel information, time information, sound volume information, subtitles, or an advertisement such as a company log. This will be described below (see FIG. 10).

A plurality of gate lines 121 and data lines 123 are intersected and arranged in the main display region. The gate lines 121 are arranged in a first direction, for example, a width direction. The data lines 123 are arranged in a second direction, for example, a height direction. In this way, a plurality of pixel areas are defined by the intersected and arranged gate lines 121 and data lines 123. Although not shown, a thin film transistor is formed as a switching element in an area where the gate line 121 and the data line 123 intersects each other. A pixel electrode connected to the thin film transistor is formed in the pixel area. Therefore, the lower substrate 120 is formed as an array substrate with thin film transistors formed therein.

The pad 125 is formed in the peripheral region.

The pad 125 is connected to the gate line 121 or the data line 123. In the drawing, the pad 125 (i.e., a data pad) connected to the data line 123 is illustrated.

The sealant 140 may be formed in the peripheral region. The sealant 140, as described above, adheres the lower substrate 120 to the upper substrate 110. As illustrated, the sealant 140 is applied onto the lower substrate 120, and then a coupling process may be performed for coupling the upper substrate 110 and the lower substrate 120. That is, for convenience, the sealant 140 being formed is illustrated in FIGS. 3A and 3B, but the sealant 140 may be actually applied onto any one of the upper substrate 110 and lower substrate 120, and then a coupling process may be performed for coupling the upper substrate 110 and the lower substrate 120.

The sealant 140, as illustrated, may be formed more outward from the lower substrate 120 than the pad 125, but the present embodiment is not limited thereto. As another example, the pad 125 may be formed more outward from the lower substrate 120 than the sealant 140. However, when the pad 125 is formed more outward from the lower substrate 120 than the sealant 140, the pad 125 can be exposed to the outside and corroded, and thus, in order to prevent corrosion, the sealant 140 may be formed more outward from the lower substrate 120 than the pad 125.

As seen in FIG. 3B, similarly to the above-described lower substrate 120, the upper substrate 110 may also include a main display region and a peripheral region around the main display region. However, the peripheral region of the upper substrate 100 is broader than that of the lower substrate 120, and thus, as described above, the upper substrate 110 is extended longer than the lower substrate 120.

A light blocking layer 111 and a color filter layer 112 are formed in the main display region.

The light blocking layer 111 prevents light leakage, and are formed in a matrix structure in correspondence with the gate lines 121 and the data lines 123 that are formed at the lower substrate 120.

The color filter layer 12 includes a plurality of red (R), green (G), and blue (B) color filters that are arranged at certain intervals, and the light blocking layer 111 includes a plurality of black matrixes that are arranged at certain intervals. Each of the color filters is formed between two black matrixes adjacent thereto, thereby enabling the realization of full color in the LCD device. Accordingly, the upper substrate 110 may be a color filter substrate with color filters formed therein.

The connection part 113 is formed in the peripheral region. The connection part 113 includes the pad contact part 114, the driver contact part 115, and the connection line 116.

The pad contact part 114 is formed at a position corresponding to the pad 125 so as to contact the pad 125 of the lower substrate 120

The driver contact part 115 is formed near a distal end of the peripheral region, and thus, even after the upper substrate 110 is coupled to the lower substrate 120, the driver contact part 115 is exposed to the outside.

The connection line 116 connects the pad contact part 114 and the driver contact part 115.

Moreover, the sealant may be formed in the peripheral region.

As illustrated, the sealant 140 may be formed more outward from the upper substrate 110 than the pad contact part 114, but the present embodiment is not limited thereto. The pad contact part 114 may be formed more outward from the upper substrate 110 than the sealant 140. However, in order to prevent corrosion, the sealant 140 may be formed more outward from the lower substrate 120 than the pad contact part 114.

FIGS. 4 to 9 are schematic sectional views illustrating LCD devices according to various embodiments of the present invention, and correspond to a sectional surface of line I-I of FIGS. 3A and 3B. Hereinafter, the LCD devices according to the embodiments will be described.

Figure 4:
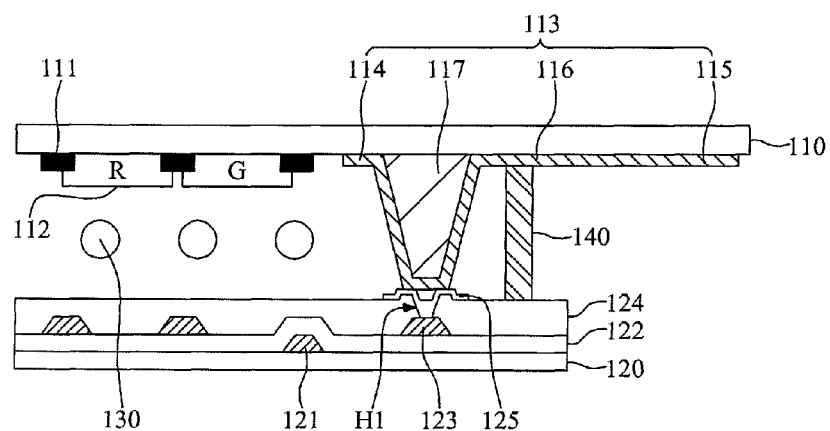
FIGS. 4 to 9 are schematic sectional views illustrating LCD devices according to various embodiments of the present invention, and correspond to a sectional surface of line I-I of FIGS. 3A and 3B.

FIG. 4 is a schematic sectional view illustrating an LCD device according to an embodiment of the present invention. As seen in FIG. 4, the LCD device according to an embodiment of the present invention include a lower substrate 120, an upper substrate 110, a liquid crystal layer 130, and a sealant 140.

A gate line 121 is formed on the lower substrate 120, and a gate insulation layer 122 is formed on the gate line 121. A data line 123 is formed on the gate insulation layer 122, and a passivation layer 124 is formed on the date line 123.

The passivation layer 124 includes a first contact hole H1, and the data line 123 is exposed by the first contact hole H1.

A pad 125 is formed on the passivation layer 124. The pad 125 is connected to the data line 123 through the first contact hole H1.

A light blocking layer 111 is formed on the upper substrate 110. Each of color filters configuring the color filter layer 112 is formed between two black matrixes adjacent thereto among a plurality of black matrixes configuring the light blocking layer 111. Although not shown, an overcoat layer for substrate planarization may be additionally formed on the color filter layer 112.

Moreover, a connection part 113 is formed on the upper substrate 110. Specifically, a protrusion part 117 is formed at a position corresponding to the pad 125. A pad contact part 114 is formed on the protrusion part 117, and a connection line 116 is connected to the pad contact part 114. The driver contact part 115 is connected to the connection line 116.

The pad contact part 114, the driver contact part 115, and the connection line 116 that configure the connection part 113 may be formed of the same conductive material. For example, the pad contact part 114, the driver contact part 115, and the connection line 116 may be formed of a metal material such as copper (Cu), molybdenum (Mo), or AlNd, or formed of a transparent conductive material such as indium tin oxide (ITO).

The protrusion part 117 may be formed of the same material as that of a column spacer (not shown) that is applied for maintaining a cell gap in the LCD device, in the same process as that of the column spacer.

The liquid crystal layer 130 is formed between the upper substrate 110 and the lower substrate 120.

The sealant 140 is formed at an edge of each of the upper substrate 110 and lower substrate 120. Particularly, the sealant 140 may be formed at a position corresponding to the connection line 116.

Figure 5:
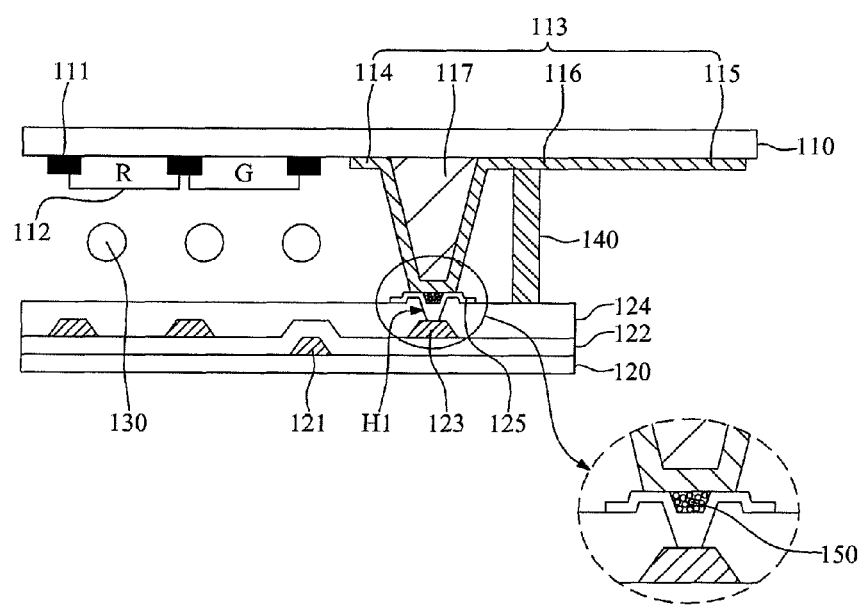

FIG. 5 is a schematic sectional view illustrating an LCD device according to another embodiment of the present invention. Except that a contact assistance mean 150 is additionally formed, the LCD device according to another embodiment of the present invention has the same configuration as that of the LCD device of FIG. 4. Therefore, like elements are respectively indicated by like reference numerals, and a repetitive description on the same element is not provided.

A pad 125 formed on a lower substrate 120 is connected to a data line 123 through a first contact hole H1. According to such a connection structure, a recessed valley is formed in the pad 125.

Therefore, a valley area formed in the pad 125 cannot contact the pad contact part 114. That is, due to the valley area formed in the pad 125, a contact area between pad 125 and the pad contact part 114 is reduced.

According to another embodiment of the present invention in FIG. 5, the contact assistance mean 150 is formed between the pad 125 and the pad contact part 114, particularly, in the valley area of the pad 125, thereby increasing a contact area between the pad 125 and the pad contact part 114.

The contact assistance mean 150 may be configured with a conductive ball, but the present embodiment is not limit thereto.

Figure 6:
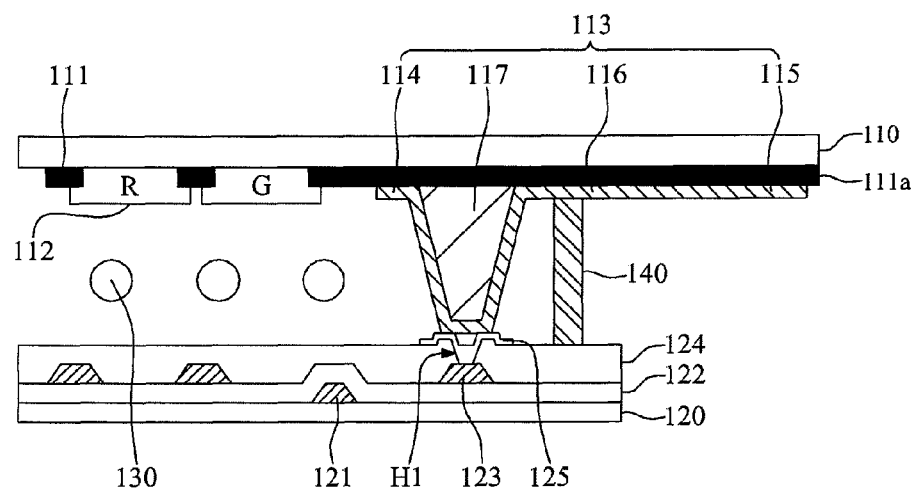
Figure 7:
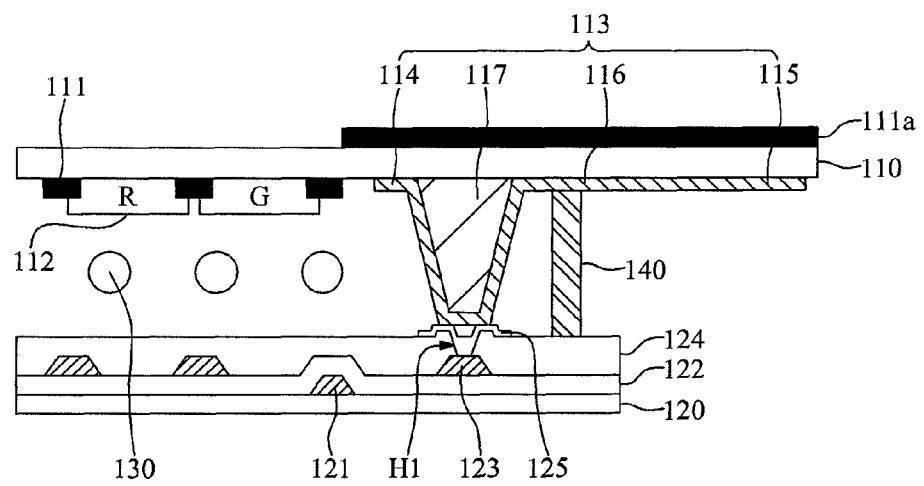

FIGS. 6 and 7 are schematic sectional views illustrating an LCD device according to another embodiment of the present invention. Except that a light blocking layer 111a is additionally formed in a connection part 113 area, the LCD device according to another embodiment of the present invention has the same configuration as that of the LCD device of FIG. 4. Hereinafter, only elements different from those of FIG. 4 will be described.

The connection part 113 formed in the peripheral region of an upper substrate 110 may be formed of a conductive metal material. In this case, external light is reflected by the connection part 113, causing the degradation in image quality. According to another embodiment of the present invention in FIGS. 6 and 7, therefore, by forming a light blocking layer 111a on the upper substrate 110 corresponding to the connection part 113, external light can be prevented from being reflected by the connection part 113.

The light blocking layer 111a may be formed of the same material as that of the light blocking layer 111 which is formed in the above-described main display region.

The light blocking layer 111a, as seen in FIG. 6, may be formed at a bottom of the upper substrate 110, more specifically, between the upper substrate 110 and the connection part 113.

The light blocking layer 111a, as seen in FIG. 7, may be formed at a top of the upper substrate 110. Particularly, when an upper polarizer is additionally formed at the top of the upper substrate 110, the light blocking layer 111a may be formed at a top of the upper polarizer or between the upper substrate 110 and the upper polarizer.

The light blocking layer 111a of FIGS. 6 and 7 may be formed at the connection part 113 or the entirety of the peripheral region. That is, in order to prevent the leakage of light from the peripheral region, the light blocking layer 111a may be formed in the entire peripheral region.

Moreover, although not shown, the LCD device of FIGS. 6 and 7 may further include the contact assistance mean 150 of the LCD device of FIG. 5.

Figure 8:
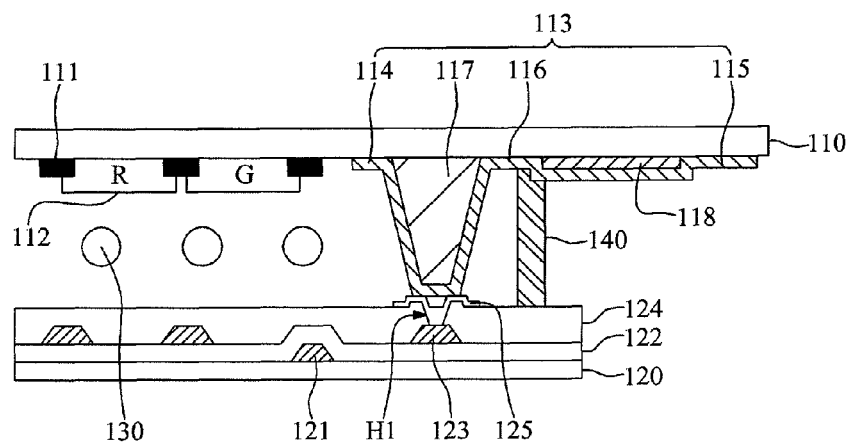

FIG. 8 is a schematic sectional view illustrating an LCD device according to another embodiment of the present invention. Except that a low-resistance conductive line 118 is additionally formed, the LCD device according to another embodiment of the present invention has the same configuration as that of the LCD device of FIG. 4. Hereinafter, only elements different from those of FIG. 4 will be described.

A connection part 113, particularly, a driver contact part 115 and a connection line 116 that is/are formed at an upper substrate 110 is/are exposed to the outside, and thus can be corroded. Accordingly, in order to prevent corrosion, the driver contact part 115 and the connection line 116 may be formed of a transparent conductive material such as ITO. However, the transparent conductive material such as ITO has a limitation because of having a high resistance.

Therefore, in another embodiment of the present invention of FIG. 8, a conductive line 118 is additionally formed of a low-resistance metal material such as Cu, Mo, or AlNd, and connected to the connection part 113, thereby decreasing the resistance of the connection part 113.

That is, the externally-exposed driver contact part 115 and connection line 116 are formed of a transparent conductive material such as ITO, thus preventing the corrosion of the connection part 113. The low-resistance conductive line 118 is additionally formed between the connection line 116 and the upper substrate 110 so as not to be exposed externally, thereby decreasing the resistance of the connection part 113.

Unlike the illustrated in FIG. 8, the conductive line 118 is not formed only between the connection line 116 and the upper substrate 110, or the conductive line 118 may be formed between the driver contact part 115 and the upper substrate 110. Depending on the case, the conductive line 118 may be formed between a pad contact part 114 and a protrusion portion 117.

Although not shown, the LCD device of FIG. 8 may further include the contact assistance mean 150 of FIG. 5, and further include the light blocking layer 111a of FIG. 6 or FIG. 7. Alternatively, the LCD device of FIG. 8 may further include both the contact assistance mean 150 and the light blocking layer 111a.

Figure 9:
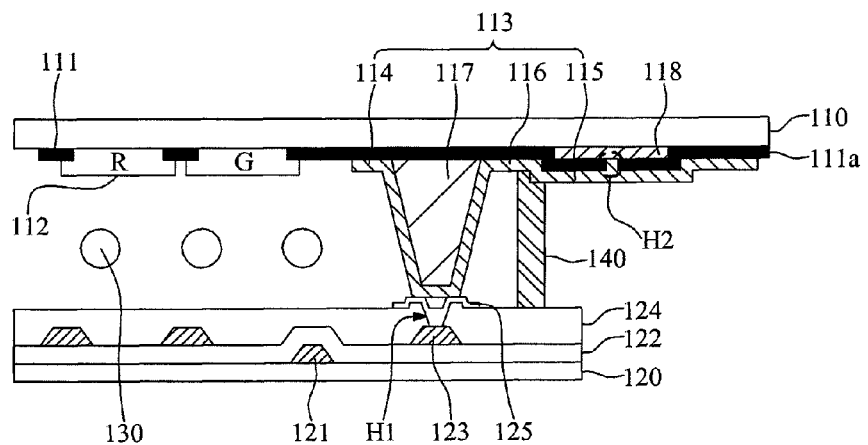

FIG. 9 is a schematic sectional view illustrating an LCD device according to another embodiment of the present invention. Except that a light blocking layer 111a and a low-resistance conductive line 118 are additionally formed in a connection part 113 area, the LCD device according to another embodiment of the present invention has the same configuration as that of the LCD device of FIG. 4. Hereinafter, only elements different from those of FIG. 4 will be described.

According to FIG. 9, the light blocking layer 111a is additionally formed at a bottom of an upper substrate 110 similarly to FIG. 6, and moreover, the conductive line 118 is additionally formed at the bottom of the upper substrate 110 similarly to FIG. 8.

However, the conductive line 118 is formed between the upper substrate 110 and the light blocking layer 111a. That is, as illustrated, the conductive line 118 is formed at a bottom of the upper substrate 110, and a light blocking layer 111a is formed at a bottom of the conductive line 118. A connection part 113 is formed at a bottom of the light blocking layer 111a.

The conductive line 118 and the connection part 113 are required to be electrically connected to each other, for which a second contact hole H2 is formed in the light blocking layer 111a. That is, the connection part 113 is connected to the conductive line 118 through the second contact hole H2 that is formed in the light blocking layer 111a.

Although not shown, the LCD device of FIG. 9 may further include the contact assistance mean 150 of FIG. 5.

Figure 10A:
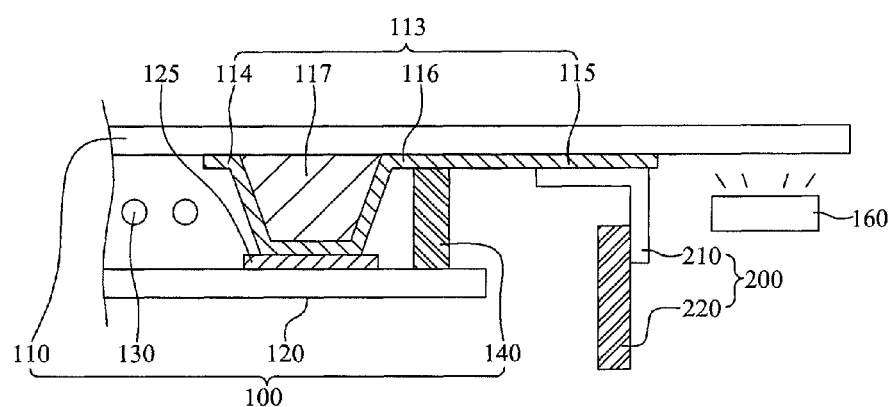
FIG. 10A is a schematic sectional view illustrating an LCD device according to another embodiment of the present invention.
Figure 10B:
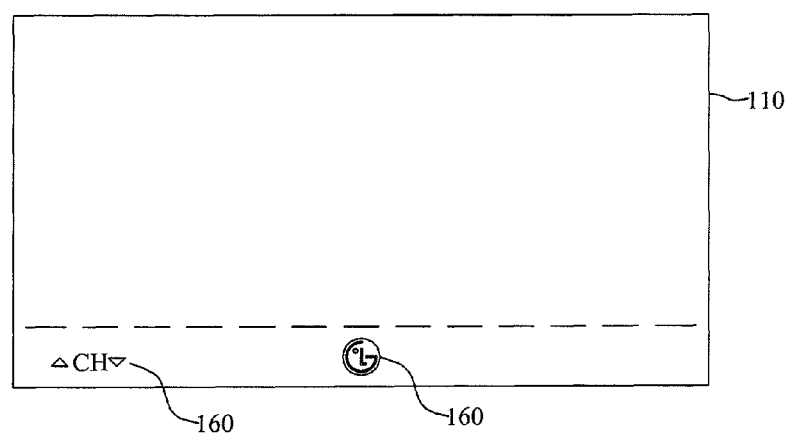
FIG. 10B is a schematic plan view illustrating an LCD device according to another embodiment of the present invention.

FIG. 10A is a schematic sectional view illustrating an LCD device according to another embodiment of the present invention. FIG. 10B is a schematic plan view illustrating an LCD device according to another embodiment of the present invention. Unlike the above-described LCD device of FIG. 2, the LCD device of FIGS. 10A and 10B further includes an auxiliary display device 160. Hereinafter, only elements different from those of FIG. 2 will be described.

As seen in FIGS. 10A and 10B, the auxiliary display device 160 is formed in a peripheral region of the LCD device, for example, a peripheral region where a panel driver 200 is formed. The position of the auxiliary display device 160 according to the present invention is not limited to herein, the auxiliary display device 160 may be formed on the part of lower surface of the upper substrate or the front surface of the upper substrate corresponding to the part of lower surface of the upper substrate.

The auxiliary display device 160 displays a sub-screen such as channel information, time information, sound volume information, subtitles, or an advertisement such as a company log.

The auxiliary display device 160 is disposed under an upper substrate 110, and thus, the upper substrate 110 is long extended in proportion to the area of the auxiliary display device.

In the related are LCD devices, a sub-screen such as a company log is displayed on an external case. However, in the present embodiment, the auxiliary display device 160 is disposed under the upper substrate 110, thus providing an LCD device with enhanced aesthetic appearance even without the existing external case.

The auxiliary display device 160 may be applied to various display devices, which are known to those skilled in the art, such as Light Emitting Diode (LED) display devices.

Figure 11:
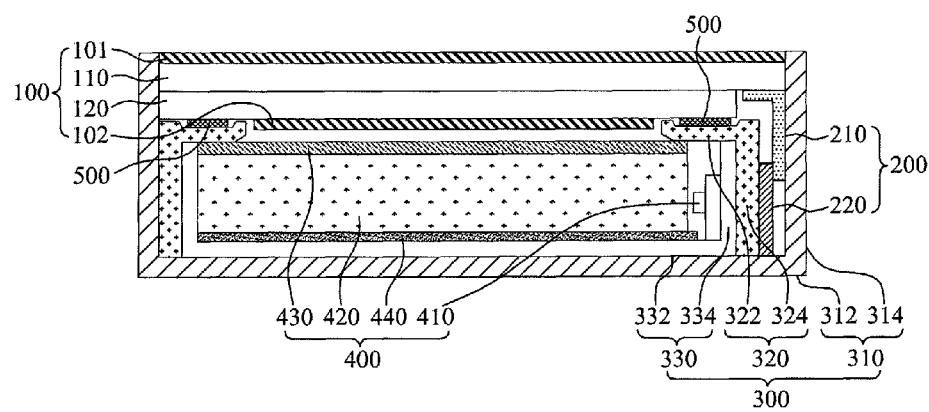
FIG. 11 is a schematic sectional view illustrating an LCD device according to another embodiment of the present invention.

FIG. 11 is a schematic sectional view illustrating an LCD device according to another embodiment of the present invention, and illustrates a structure where a backlight unit 400 and the like is additionally coupled to a liquid crystal display panel 100.

As seen in FIG. 11, the LCD device according to another embodiment of the present invention includes the liquid crystal display panel 100, a panel driver 200, a support member 300, the backlight unit 400, and a coupling member 500.

The liquid crystal display panel 100 includes an upper substrate 110, an upper polarizer 101, a lower substrate 120, and a lower polarizer 102.

The upper polarizer 101 is formed at a top of the upper substrate 110, and the lower polarizer 102 is formed at a bottom of the lower substrate 120. A light transmittance is adjusted by the combination of the upper polarizer 101 and lower polarizer 102, thereby displaying an image.

Except for the upper polarizer 101 and the lower polarizer 102, as described above, the configuration of the LCD device 100 including the upper substrate 110 and the lower substrate 120 may be changed variously.

The panel driver 100 includes a circuit film 210 and a PCB 220. The panel driver 200 is as described above, and thus, its repetitive description is not provided.

The support member 300 supports the liquid crystal display panel 100, the panel driver 200, and the backlight unit 400, and acts as an external cover. In more detail, the support member 300 includes a set cover 310, a guide frame 320, and a support case 330.

The set cover 310 acts as an external cover of an LCD device such as a notebook computer, particularly, acts as a bottom cover and side cover of an LCD device. For this end, the set cover 310 includes a plate 312 and a side wall 314 that is bent and extended from one end of the plate 312.

The plate 312 acts as a bottom cover of the LCD device, and the side wall 314 acts as a side cover of the LCD device. The side wall 314 is formed to contact a side surface of the liquid crystal display panel 100, and thus, the side wall 314 configures the Bezel of the LCD device, thus considerably reducing the Bezel width compared to the related art LCD devices. In this case, the height of the side wall 314 is matched with that of the liquid crystal display panel 100, and thus, the front surface of the LCD device has a flat surface entirely.

The set cover 310 includes a certain receiving space by the combination of the plate 312 and side wall 314. The receiving space receives the liquid crystal display panel 100, the panel driver 200, the guide frame 320, the support case 330, and the backlight unit 400.

The guide frame 320 guides the position of the backlight unit 400 and supports the liquid crystal display panel 100. For this end, the guide frame 320 includes a first support part 322 and a first guide part 324.

The first support part 322 supports a bottom of the liquid crystal display panel 100, particularly, a bottom edge of the lower substrate 120. The first guide part 324 is extended from the first support part 322 and guides the position of the backlight unit 400 and the support case 330.

The support case 330 guides the position of the backlight unit 400 and supports the backlight unit 400. For this end, the support case 330 includes a second support part 332 and a second guide part 334.

The second support part 332 supports a bottom of the backlight unit 400. The second guide part 334 is extended from the second support part 332, faces a side surface of the backlight unit 400, and guides the position of the backlight unit 400.

The support case 330, moreover, conformally transfers and dissipates heat that is generated in the backlight unit 400. That is, since heat is generated in the backlight unit 400, a heat dissipation instrument is required for dissipating the heat that is generated in the backlight unit 400. Accordingly, when the support case 330 is formed of a material such as metal enabling the conduction of heat, the heat generated in the backlight unit 400 is transferred through the support case 330 and thus dissipated to the outside.

However, the support case 330 may not be provided depending on the case, in which case the backlight unit 400 may be supported by the above-described set cover 310.

In this way, coupling between the set cover 310, the guide frame 320, and the support case 330 that configure the support member 300, namely, coupling between the set cover 310 and the guide frame 320, coupling between set cover 310 and the support case 330, or coupling between the guide frame 320 and the support case 330 may be performed with a double-sided adhesive or through a hook coupling with a groove and a protrusion material or, depending on the case, with a bolt and a nut.

The backlight unit 400 is disposed under the liquid crystal display panel 100 and supplies light to the liquid crystal display panel 100. The position of the backlight unit 400, as described above, is guided by the guide frame 320 and the support case 330.

The backlight unit 400 may be categorized into a direct type where at least one light source is disposed at an entire surface under the liquid crystal display panel 100 and light emitted from the light source is irradiated onto the liquid crystal display panel 100, and an edge type where at least one light source is disposed at one side under the liquid crystal display panel 100 and light emitted from the light source is irradiated onto the liquid crystal display panel 100 through a light guide panel. The direct type or the edge type may be applied to the present invention. That is, the edge type backlight unit 400 is illustrated in the drawings, but the present invention is not limited thereto.

The backlight unit 400 includes a light source 410, a light guide panel 420, an optical sheet 430, and a reflector 440.

The light source 410 is disposed to face a side surface of the light guide panel 420. Light emitted from the light source 410 is incident on the light guide panel 420 and then the path of the light is changed toward the liquid crystal display panel 100. An LED or a fluorescent lamp may be used as the light source 410.

The light guide panel 420 changes the path of light, emitted from the light source 410, toward the liquid crystal display panel 100. For the change of the light path, although not shown, a groove or protrusion pattern having various shapes is formed at the light guide panel 420.

The optical sheet 430 is formed on the light guide panel 420 and conformally supplies light to the liquid crystal display panel 100, and may be formed by the combination of a diffuser sheet and a prism sheet.

The reflector 440 is formed under the light guide panel 420 and reflects light, which is leaked to under the light guide panel 420, to an upper portion thereof, thus increasing light efficiency.

The coupling member 500 couples the liquid crystal display panel 100 and the support member 300. Specifically, the coupling member 500 is formed between the liquid crystal display panel 100 and the guide frame 320 and, by coupling the liquid crystal display panel 100 to the guide frame 320, prevents the deviation of the liquid crystal display panel 100 toward an upper portion thereof. The coupling member 500 may use an adhesive such as a double-sided tape, a thermosetting adhesive, or a photocurable adhesive.

The lower polarizer 122 of the liquid crystal display panel 100 is not formed in an area where the coupling member 500 is formed, namely, the coupling member 500 is formed between the lower substrate 120 and the first support part 322 of the guide frame 320, thus preventing the increase in the thickness of the LCD device due to the addition of the coupling member 500.

Figure 12:
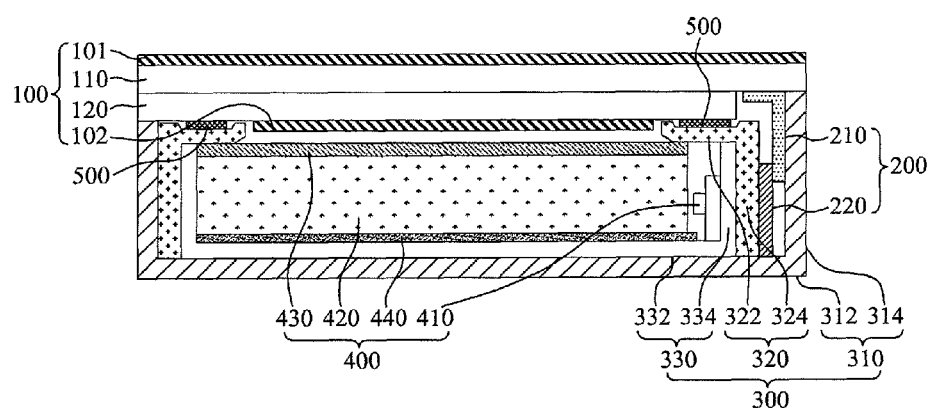
FIG. 12 is a schematic sectional view illustrating an LCD device according to another embodiment of the present invention.

FIG. 12 is a schematic sectional view illustrating an LCD device according to another embodiment of the present invention. Except that the configuration of the support member 300 is changed, the LCD device of FIG. 12 has the same configuration as that of FIG. 11. Hereinafter, only elements different from those of FIG. 11 will be described.

The support member 300 includes a set cover 310, a guide frame 320, and a support case 330. The configuration of the set cover 310 differs from that of the above-described LCD device of FIG. 11.

As seen in FIG. 12, the set cover 310 includes a plate 312 and a side wall 314 that is bent and extended from one end of the plate 312. In this case, the side wall 314 does not contact a side surface of the liquid crystal display panel 100 but contacts a bottom of the liquid crystal display panel 100, more specifically, a bottom of the upper substrate 110.

As described above, since the side wall 314 is formed to contact the bottom of the liquid crystal display panel 100, the Bezel of the LCD device is completely removed, and thus, a aesthetic appearance can be more enhanced. Also, since the side wall 314 does not contact the side surface of the liquid crystal display panel 100, the front surface of the LCD device is configured with only the display panel 100.

According to the embodiments of the present invention, since the panel driver is adhered to the bottom of the upper substrate, the panel driver is not exposed to the front surface of the LCD device, and thus, unlike the related art, a separate case for covering the panel driver is not disposed on the top of the upper substrate.

Accordingly, the thickness of the LCD device according to the present invention is reduced, and moreover, a step height is not formed at the front surface of the LCD device, whereby the present invention can obtain an aesthetic design effect in that the front surface of the LCD device is shown as one structure.

The above explanation shows a LCD device corresponding to one of the display devices. However, the display devices according to the present invention are not limited to the above liquid crystal display device. The LCD devices according to the present invention may be applied to various flat display devices such as organic light emitting display device (OLED), EPD, etc. For example, in case of the display device of the organic light emitting display device, an organic light emitting device is formed on upper or lower substrate, and the organic light emitting device is driven by a panel driver connected to the upper substrate so that an image is displayed by light emitted to the external through the upper substrate.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
   a lower substrate having gate and data lines;
   an upper substrate formed as a color filter substrate with color filters, wherein the upper substrate extends longer than the lower substrate;
   a sealant for adhering the upper substrate to the lower substrate;
   a panel driver connected to a bottom of the longer-extending upper substrate;
   a pad formed on the lower substrate, for applying a signal to the gate and data lines; and
   a connection part formed on the upper substrate, for connecting the pad and the panel driver,
   wherein the connection part comprises:
      a pad contact part contacting the pad;
      a driver contact part contacting the panel driver;
      a connection line connecting the pad contact part and the driver contact part; and
      a protrusion portion formed between the upper substrate and the pad contact part and guiding the pad contact part to be connected to the pad.

2. The display device of claim 1, further comprising a contact assistance mean formed between the pad and the pad contact part.

3. The display device of claim 2, wherein the contact assistance mean comprises a conductive ball.

4. The display device of claim 3, wherein the contact assistance mean comprises the conductive ball formed in a valley area of the pad.

5. The display device of claim 1, further comprising a light blocking layer formed between the upper substrate and the connection part.

6. The display device of claim 1, further comprising a light blocking layer formed at a upper surface of the upper substrate corresponding to the connection part.

7. The display device of claim 1, further comprising a conductive line connected to the connection part for reducing a resistance of the connection part.

8. The display device of claim 7, wherein the conductive line is formed at a lower surface of the upper substrate, and covered by the connection part.

9. The display device of claim 7, wherein the conductive line is stacked to the connection part.

10. The display device of claim 9, wherein the conductive line is formed between the connection line and the lower surface of the upper substrate.

11. The display device of claim 7, further comprising:
a light blocking layer cover the conductive line with a contact hole exposing a part of the conductive line.

12. The display device of claim 11, wherein the connection part is connected to the conductive line through the contact hole.

13. The display device of claim 1, further comprising an auxiliary display device formed on the upper substrate.

14. The display device of claim 13, wherein the auxiliary display device is formed on a part of a lower surface of the upper substrate or a front surface of the upper substrate corresponding to the part of the lower surface of the upper substrate.

15. The display device of claim 1, wherein the sealant is formed more outward than the pad.

16. The display device of claim 1, further comprising:
a backlight unit disposed under the display panel; and
a support member supporting the display panel and the backlight unit,
wherein the support member comprises a set cover contacting a side surface of the display panel.

17. The display device of claim 1, further comprising:
a backlight unit disposed under the display panel; and
a support member supporting the display panel and the backlight unit,
wherein the support member comprises a set cover contacting a bottom of the display panel.

* * * * *